(12) United States Patent
Coers et al.

(10) Patent No.: US 6,170,244 B1
(45) Date of Patent: Jan. 9, 2001

(54) CAM PATH FOR ORIENTATING FINGERS OF A HARVESTING REEL

(75) Inventors: Bruce Alan Coers, Hillsdale; Roderick James Jensen, Moline, both of IL (US)

(73) Assignee: Deere & Company, Moline, IL (US)

(*) Notice: Under 35 U.S.C. 154(b), the term of this patent shall be extended for 0 days.

(21) Appl. No.: 09/301,293

(22) Filed: Apr. 28, 1999

(51) Int. Cl.⁷ .................................................. A01D 57/02
(52) U.S. Cl. ............................................. 56/226; 460/142
(58) Field of Search ........................... 56/226, 227, 14.4, 56/400, 327.1, 364, 13.3, 400.21, 220, 128, 12.4; 460/142, 121, 122; 384/281, 275

(56) References Cited

U.S. PATENT DOCUMENTS

| | | |
|---|---|---|
| 2,694,894 | 11/1954 | Linscheid . |
| 3,472,008 | 10/1969 | Hurlburt . |
| 3,940,910 * | 3/1976 | D'Acremont .......................... 56/14.4 |
| 4,008,558 | 2/1977 | Mott . |
| 4,353,201 * | 10/1982 | Pierce et al. ............................ 56/364 |
| 5,007,235 | 4/1991 | Nickel et al. . |
| 5,566,536 | 10/1996 | Krafka et al. . |
| 5,595,053 | 1/1997 | Jasper et al. . |
| 5,768,870 | 6/1998 | Talbot et al. . |
| 5,987,861 | 11/1999 | Duncan et al. . |

FOREIGN PATENT DOCUMENTS 0 280 790   9/1988   (EP) .

OTHER PUBLICATIONS

Database WPI Section PQ, Week 199134 Derwent Publications Ltd., London, GB; Class P12 AN 1991-251390 XP002141465 & SU 1 598 904 A (SHMARIN N S), Oct. 15, 1990.

* cited by examiner

Primary Examiner—Thomas B. Will
Assistant Examiner—Arpad Fabian Kovacs

(57) ABSTRACT

A pickup reel for a harvesting platform including a reel support structure with a reel shaft rotatably supported thereon. A plurality of radially extending arms are mounted to the reel shaft and a plurality of transverse rockshafts are mounted to the radially extending arms and are axially offset and parallel to the reel shaft and span the width of the platform. Radial fingers are mounted on each rockshaft. A cam is mounted to the support structure adjacent one or both ends of the rockshafts and defines an endless cam path about the reel shaft. A crank arm attached to each rockshaft carries a cam follower that engages the cam path for following along the path. The cam path is configured to cause the crank arms, and thus the rockshafts, to rotate about the respective rockshaft axis to vary the attitude of the fingers relative to the ground as the cam followers move along the cam path. The cam is segmented, having two or more cam segments joined together to form the endless cam path. The cam segments are joined together by removable fasteners to enable one segment to be removed and replaced to either vary the cam path or to replace a worn cam segment.

8 Claims, 3 Drawing Sheets

CAM PATH FOR ORIENTATING FINGERS OF A HARVESTING REEL

BACKGROUND OF THE INVENTION

1. Field of the Invention

The present invention relates to harvesting reels and in particular to a reel having a segmented cam for orienting the pickup fingers of the reel and for providing a cam path that provides greater engagement of the fingers with the crop.

2. Description of the Prior Art

It is known, as shown in U.S. Pat. No. 4,008,558, to provide a pick up reel for a harvester where the fingers maintain a constant attitude relative to the ground. The path of the fingertips generates a cylinder. A plurality of transversely spaced spiders is attached to the reel shaft having arms that carry rockshafts at their outer ends. The rockshafts are coupled via crank arms to eccentric spiders at the ends of the reel. Fingers depend from each rockshaft and the rockshafts are rotated relative to the spider arms during rotation of the reel so that the fingers maintain a constant attitude relative to the ground.

A similar mechanism is shown in U.S. Pat. No. 5,768,870. There, the linkage mechanism that controls the orientation of the fingers provides a fingertip path that is non-cylindrical. The orientation, or attitude, of the fingers relative to the ground, however, remains constant through the crop engagement region.

Both of the above patents control the finger orientation by a disk that is eccentric to the reel pivot axis. Links extend radially outward from the disk and are coupled to the crank arms that are fixed to the rockshafts. With such a mechanism, the fingertip path is fixed and cannot be adjusted by the user. Some harvesting reels, such as that shown in U.S. Pat. No. 4,008,558, do provide a mechanism by which the attitude of the fingers can be adjusted by the user to provide greater or lesser degrees of lift to the crop. While the attitude of the fingers relative to the ground can be adjusted, the fingertip path is always cylindrical.

Other finger orientation control mechanisms are shown in U.S. Pat. Nos. 5,007,235, 5,566,536 and 5,595,093. These patents all show cams to control the finger attitude. The cams can be circular or irregular in shape to produce varied finger paths and attitudes. One drawback in the prior art is the inability to change the finger path or attitude for changing conditions.

SUMMARY OF THE INVENTION

It is thus an object of the present invention to provide a control mechanism for the fingers that enable the fingertip path to be selectively varied.

It is a feature of the invention that the fingertip path has greater engagement with the crop to pick the crop up and deposit the crop further back on the platform.

It is an advantage of the invention that the cam is constructed of multiple cam segments. This enables one cam segment to be replaced if worn or to change the finger path without the need to replace the entire cam.

The present invention provides for an enlarged cam mounted at one or both ends of the reel. The cam defines a cam path for cam followers that are attached to crank arms that are fixed to rockshafts. Typically, a cam is provided at each end of the reel. However, it is possible to utilize a single cam at one end of the reel.

The cams form endless cam paths about the reel shaft. Cam followers move along the cam paths. The cam followers are mounted to the crank arms that are fixed to the rockshafts carrying the pickup fingers. Radially extending arms on the reel shaft carry the rockshafts. As the reel rotates, the radially extending arms move the rockshafts in a circular path about the reel shaft. The cam followers follow behind the rockshafts and are varied in position relative to the rockshafts by the cam paths, thus causing rotation of the rockshafts. The cam path determines the fingertip path. Different cam paths can be used to provide different fingertip paths. In a preferred embodiment, the cams are each made of multiple cam segments joined together at their ends. Removable fasteners are used to join the cam segments so that one or more cam segments can be selectively removed and replaced. This enables a portion of the fingertip paths to be varied, particularly the portion of the path through the crop pick-up zone where the fingers engage and pickup the crop and deposit the crop onto the harvesting platform. The cam can be molded of plastic resin for ease in manufacture of complex cam shapes and to reduce weight compared to a cast metal cam. In the crop engagement region, the cam is more subject to wear. By manufacturing the cam of multiple segments, only the segments affected by wear need to be replaced.

The cams are mounted to spokes that extend radially from the reel support structure. The cams are preferably coupled to the spokes by removable fasteners to enable the cams to be easily removed from the spokes.

A preferred cam path includes a crop engagement region having various zones and different finger attitudes in the different zones. An approach zone in front of the cutterbar orients the fingers so that the fingertips move in a generally horizontal path to sweep the ground in front of the cutterbar. A lift zone follows in which the rockshafts rotate to lift the fingertips over the cutterbar and crop dam. The lift zone is followed by a release zone in which the rockshafts rotate in the opposite direction to drop the crop onto the platform floor and to provide clearance between the fingers and the platform auger.

DETAILED DESCRIPTION OF THE PREFERRED EMBODIMENT

Figure 1:
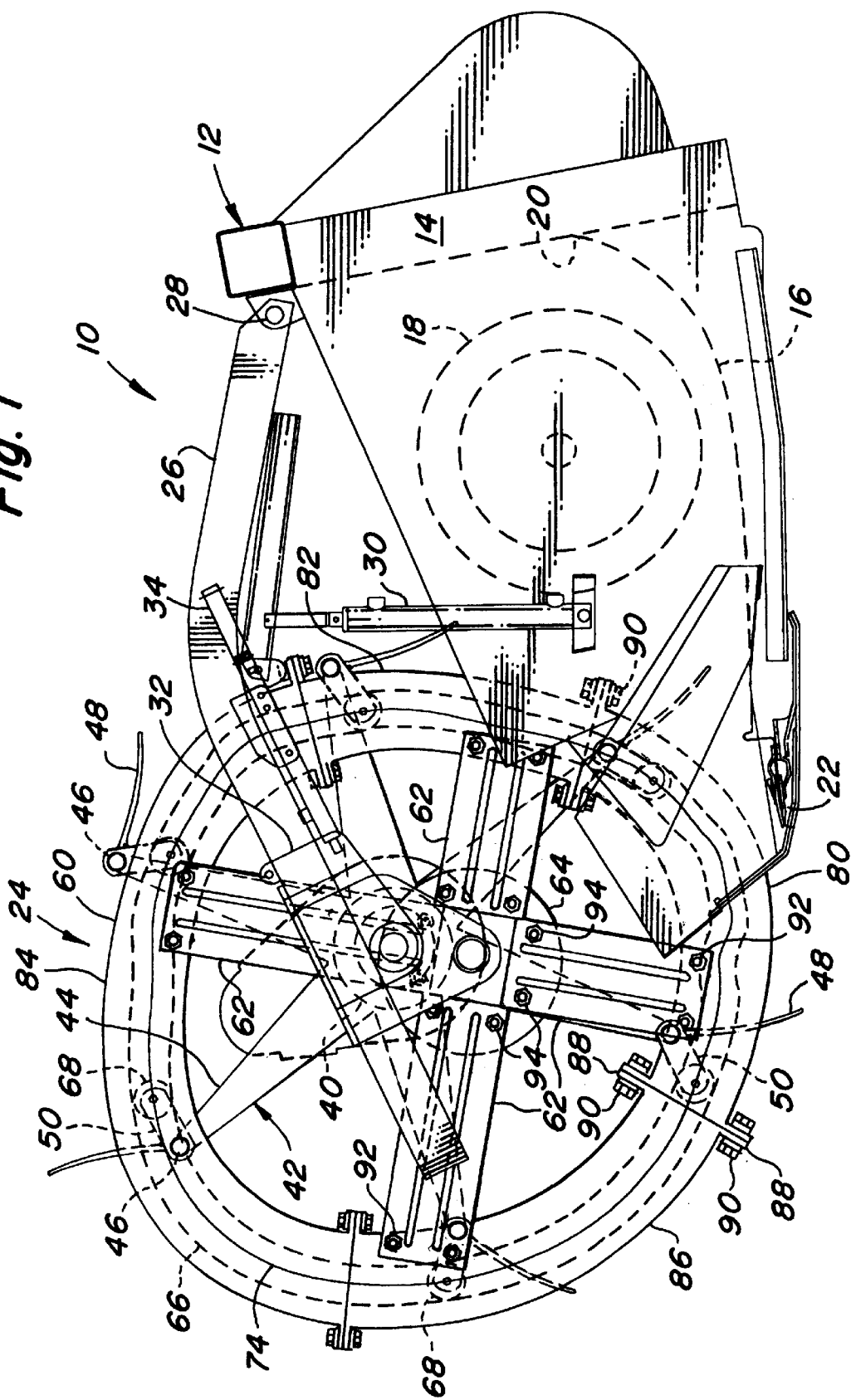
FIG. 1 is a side view of a harvesting platform having a pickup reel of the present invention.

The invention is embodied in a platform indicated in its entirety by the numeral 10. The platform 10 includes a platform frame 12 and right and left sidewalls 14, only one of which is shown. A floor 16 extends between the opposite sidewalls 14. A transverse crop converging auger 18 is mounted above the floor 16 and forward of the platform rear wall 20. A transverse cutterbar 22 is mounted along the leading edge of the floor 16 and an upright crop dam 23 is provided between the cutterbar 22 and the floor 16.

A pickup type harvesting reel, indicated generally by the numeral 24, spans the width of the platform 10, forward of the auger 18 and above the cutterbar 22. The reel is mounted on the platform by a pair of generally fore and aft reel support arms 26 that are pivotally connected to the platform frame 12 at their rear ends by transverse pivots 28. The reel support arms are generally above the right and left sidewalls 14. The support arms 26 are vertically adjustable by a pair of cylinders 30 operative between the support arms and the platform sidewalls.

Mounted on the forward end of each support arm 26 is a sleeve like support structure 32. The support structures 32 are slidable between positions along the support arms 26 and are held in place by a second pair of cylinders 34.

Figure 3:
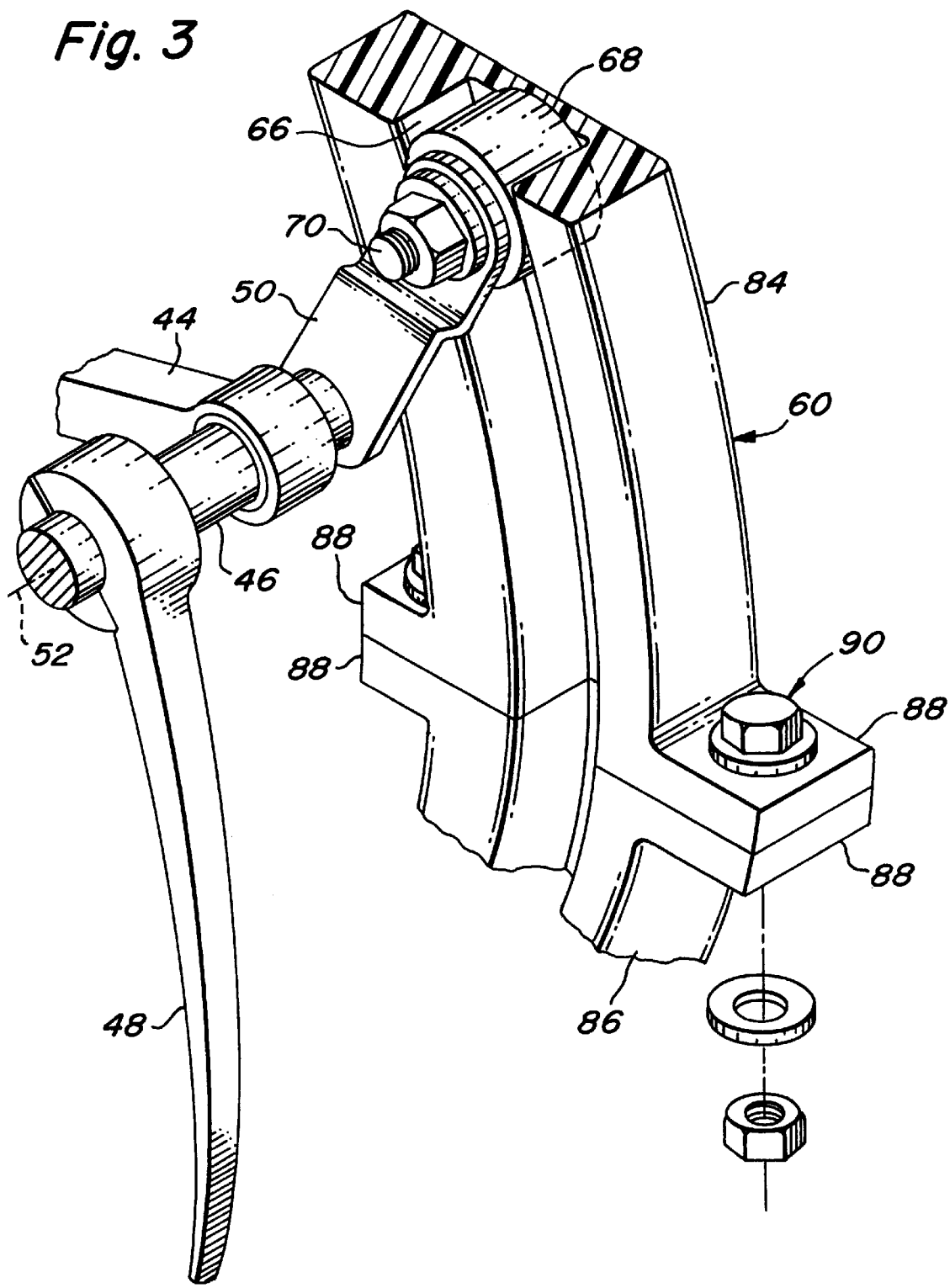
FIG. 3 is an enlarged fragmentary view illustrating the cam construction and interaction with the cam followers.

A tubular reel shaft 40 is journaled into and extends between the opposite support structures 32. The reel shaft 40 has a number of axially spaced, radial members or spiders 42. In the illustrated embodiment, the spiders 42 each have six radially extending arms 44 that are axially aligned with one another. A transverse rockshaft 46 is journaled in the outer ends of each set of axially aligned radially extending arms 44 and spans the width of the reel. Each rockshaft 46 carries a large number of depending rake like fingers or tines 48. Crank arms 50 are attached to the opposite ends of each rockshaft 46 and rotate with the rockshafts 46 about the axis 52 (FIG. 3) of each rockshaft.

A pair of cams 60 controls the angular position of the rockshafts 46 and the crank arms 50. One cam 60 is disposed at each end of the reel 24. Each cam 60 is mounted on a plurality of spokes 62 that are attached to the support structures 32 by a plate 64 of each support structure 32. The two cams 60 define parallel cam paths. A cam 60 is shown in greater detail in FIG. 3. The cam is a plastic molded ring having a channel 66 therein. By molding the cam of plastic, weight at the front of the platform is reduced compared to a cast metal cam. The channel 66 defines an endless cam path shown by the line 74 in FIGS. 1 and 2. A cam follower 68 in the form of a roller is pivotally mounted to each crank arm 50 by a pivot bolt 70. The cam followers 68 are disposed in the channels 66 and follow the cam path. The cam path is arranged so that the rockshafts 46 rotate 360 degrees relative to the ground for each revolution of the reel 24.

Figure 2:
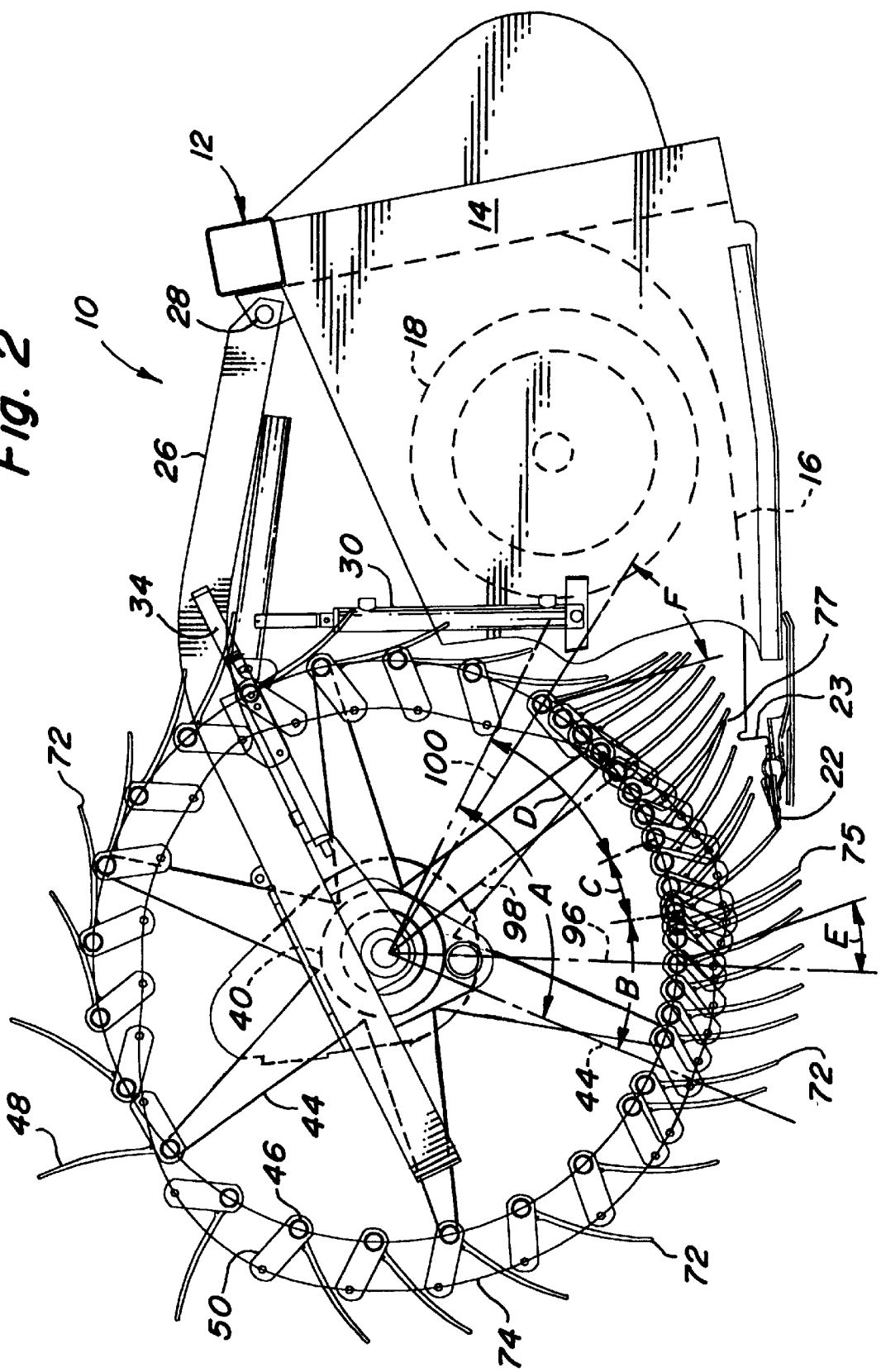
FIG. 2 is a side view of the harvesting platform similar to FIG. 1 illustrating the finger attitude and fingertip path as the fingers move about the reel.

With reference to FIG. 2, the path of the fingertips 72 of the fingers 48, as they move about the reel, is shown in greater detail. A crop engagement region is shown between the two radial lines defining the angle "A". This is approximately from the seven o'clock position to the four o'clock position as the reel rotates counter-clockwise. The crop engagement region has various zones in which the finger attitude is varied for beneficial results in handling the crop. The fingers move through an approach zone, designated as "B" in FIG. 2, in which the fingers extend outward from the reel and the fingertips move in a generally horizontal path to sweep the ground forward of the cutterbar. The rockshafts rotate slightly, relative to the ground, in a counter-clockwise direction as viewed in FIG. 2 to maintain the fingertips in a generally horizontal path. The approach zone B ends generally at the fingertip 75 in FIG. 2.

After the approach zone, the fingers 48 move through a lift zone, designated as "C" in FIG. 2, in which the rockshafts rotate further in the counter-clockwise direction, relative to the ground, to lift the fingertips, and the crop, over the cutterbar 22 and the crop dam 23. The lift zone C ends generally at the fingertip 77 in FIG. 2. Following the lift zone, the fingers 48 sweep over the front portion of the platform floor 16. This is the beginning of a release zone, designated as "D" in FIG. 2. In the release zone, the rockshafts are rotated in the clockwise direction relative to the ground. This allows any crop on the fingers to fall to the platform as the fingers move to a more vertical orientation. The fingers continue to rotate clockwise following the release zone D to clear the auger 18. The clockwise rotation of the fingers in and following the release zone allows the fingers to sweep over the front of the floor 16 and still be able to clear the auger 18.

The terms "clockwise" and "counter-clockwise" used herein are when viewing the platform as in FIGS. 1 and 2. They are not intended to be limiting terms other than that the rockshafts rotate first in one direction and then in the opposite direction in the crop engagement region.

In the approach zone B, the fingers 48 are at an advanced angle relative to the radial plane 96. This advanced angle is designated by the angle E. The finger angle E is forward, or advanced, relative to the radial plane 96 in the counter-clockwise direction of rotation of the reel. In the release zone D, the rockshafts rotate clockwise, moving the fingers through a zero angle relative to the radial plane 98, to a delayed angle F at the radial plane 100. Between the eleven and ten o'clock positions, the rockshafts rotate counter-clockwise to flip the fingers over to an advanced angle in preparation for entering the approach zone once again.

With reference again to FIGS. 1 and 3, it can be seen that the cam 60 is constructed of multiple cam segments 80, 82, 84, 86. The cam segments are formed with radial mounting flanges 88 at each circumferential end of the cam segments. The mounting flanges 88 are fastened together with nut and bolt fastener assemblies 90. Each cam segment is arcuate so as to form the endless cam path when the cam segments are joined end-to-end. The angular extent of the cam segments need not be equal for all cam segments.

If an alternative motion or action of the fingers 48 is desired, such as in the crop engagement region, the cam segment 80 can be removed and replaced with another cam segment having a different cam path. The cam segment 80 is in the crop engagement region and is subject to greater wear than the other cam segments. The cam segment 80 can be replaced when excessively worn without the need to replace the entire cam 60.

The spokes 62 are likewise fastened to the cam 60 with removable fasteners 92, such as nut and bolt assemblies, to assist in the removal and replacement of one or more cam segments. In addition, the spokes 62 are also attached to the plate 64 by removable fasteners 94.

The cam 60, illustrated in FIG. 1 with four cam segments, is only exemplary of the segmented cam of the present invention. The cam 60 can be manufactured with any number of cam segments. The invention is not limited to a cam having four segments.

The use of the cam of the present invention to alter the attitude of the pickup fingers provides the ability to change the attitude of the pickup fingers and the path followed by the fingertips. In addition, by segmenting the cam, certain portions of the cam that are more prone to wear can be easily replaced without the need to replace the entire cam. The cam is preferably made of molded plastic. This facilitates manufacture of a cam having a complex shape and reduced weight. The cam can be made by other processes and other materials, such as, but not limited to, stamped steel or cast iron. The invention should not be limited to the above-described embodiment, but should be limited solely to the claims that follow.

What is claimed is:

1. A pickup reel for a transversely elongated harvesting platform having a cutterbar along a front edge and opposite sides comprising:
   a reel support structure mounted on the platform;
   a transverse reel shaft rotatably supported on the reel support structure;

a plurality of radially extending arms mounted on the reel shaft;

a plurality of transverse rockshafts on the radially extending arms equally offset and parallel to the reel shaft and substantially spanning the width of the platform, each rockshaft having opposite ends and a transversely extending rockshaft axis;

a plurality of radial fingers mounted on each rockshaft and having outer fingertips;

a cam mounted to the reel support structure generally adjacent one end of the rockshafts, the cam defining an endless cam path about the reel shaft;

a crank arm attached to each rockshaft at the one end thereof; and a cam follower on each crank arm and engaging the cam for following along the cam path, the cam path being configured to provide a finger path having an approach zone in which the fingers extend outward from the reel and the fingertips move in a generally horizontal path to sweep the ground forward of the cutterbar and a lift zone during which the rockshafts rotate in one direction relative to the ground to lift the fingertips over the cutterbar and above the platform.

2. The pickup reel as defined by claim 1 wherein the platform further comprises a crop dam rearward of the cutterbar and during the lift zone the fingers lift the crop over the crop dam.

3. The pickup reel as defined by claim 1 wherein during the lift zone the fingertips move upward and rearward relative to the cutterbar.

4. The pickup reel as defined by claim 1 wherein the cam path is further configured to provide a release zone following the lift zone in which the rockshafts rotate in a direction opposite the direction of rockshaft rotation during the lift zone to move the fingertips forward relative to the cutterbar to release crop from the fingers and to provide clearance between the fingers and a platform auger.

5. The pickup reel as defined by claim 4 wherein in the approach and lift zones of the cam path, the fingers are oriented at an advanced angle relative to a radial plane and during the lift zone, the rockshafts are rotated to increase the angle of advance of the fingers.

6. The pickup reel as defined by claim 4 wherein during the approach and lift zones of the cam path, the fingers are oriented at an advanced angle relative to a radial plane and during the release zone, the rockshafts are rotated to move the fingers to a delayed angle relative to a radial plane.

7. The pickup reel as defined by claim 1 wherein the cam is formed of at least two arcuate cam segments having ends, the cam segments being joined together end-to-end by removable fasteners to enable selective removal and replacement of one cam segment.

8. The pickup reel as defined by claim 7 wherein one cam segment forms the crop engagement region of the cam path.

\* \* \* \* \*